United States Patent
Edwards et al.

(10) Patent No.: US 7,519,681 B2
(45) Date of Patent: Apr. 14, 2009

(54) SYSTEMS, METHODS, AND MEDIA FOR DISCOVERING REMOTE USER INTERFACE APPLICATIONS OVER A NETWORK

(75) Inventors: Jim Edwards, Portland, OR (US);
Nelson F. Kidd, Camas, WA (US);
Mark R. Walker, Beaverton, OR (US);
William J. Lewis, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 11/171,742

(22) Filed: Jun. 30, 2005

(65) Prior Publication Data
US 2007/0005727 A1 Jan. 4, 2007

(51) Int. Cl.
*G06F 15/16* (2006.01)
(52) U.S. Cl. .................. 709/217; 709/219; 709/223; 725/5; 725/26
(58) Field of Classification Search .......... 709/203, 709/217, 219, 223, 224; 725/5, 26
See application file for complete search history.

(56) References Cited

U.S. PATENT DOCUMENTS

| | | | | |
|---|---|---|---|---|
| 7,356,575 B1* | 4/2008 | Shapiro | | 709/220 |
| 7,426,545 B2* | 9/2008 | Becker et al. | | 709/219 |
| 2004/0128399 A1* | 7/2004 | Kurrasch | | 709/250 |
| 2004/0183756 A1* | 9/2004 | Freitas et al. | | 345/73 |
| 2004/0252400 A1* | 12/2004 | Blank et al. | | 360/70 |
| 2005/0175324 A1* | 8/2005 | Gravina et al. | | 386/125 |
| 2006/0080408 A1* | 4/2006 | Istvan et al. | | 709/219 |
| 2006/0161635 A1* | 7/2006 | Lamkin et al. | | 709/217 |
| 2007/0006268 A1* | 1/2007 | Mandera et al. | | 725/80 |
| 2007/0078987 A1* | 4/2007 | Walker et al. | | 709/227 |
| 2008/0155663 A1* | 6/2008 | Knowlson et al. | | 726/5 |

* cited by examiner

*Primary Examiner*—Lashonda T Jacobs
(74) *Attorney, Agent, or Firm*—Schubert Osterrieder & Nickelson PLLC

(57) ABSTRACT

Systems, methods, and media for a client device discovering remote user interface applications over a network are disclosed. Embodiments may include a remote user interface client of the client device receiving from a content directory service server a code fragment comprising a uniform resource indicator and determining whether the uniform resource indicator is associated with a remote-capable application. Further embodiments may include, in response to determining that the uniform resource indicator is associated with a remote-capable application, engaging by the client device a remote user interface server and receiving by the client device from the remote user interface server one or more display control commands associated with the remote-capable application and displaying a user interface based on the received display control commands. In some embodiments, engaging the remote user interface server comprises switching from the content directory service server. Other embodiments are disclosed and claimed.

18 Claims, 5 Drawing Sheets

SYSTEMS, METHODS, AND MEDIA FOR DISCOVERING REMOTE USER INTERFACE APPLICATIONS OVER A NETWORK

FIELD

The present invention is in the field of computer systems. More particularly, the present invention relates to system, methods, and media for discovering remote user interface applications over a network such as a local area network (LAN).

BACKGROUND

Networking between computer systems has become an integral part of computing technology. Computer systems are connected to each other through a network such as a LAN to enable communication and sharing of information between users of the different computer systems. An Internet connection often further complements the network, providing access to vast amounts of data. As networking technology becomes more inexpensive and less difficult to manage, home networks connecting multiple personal computers (PCs) are increasing in popularity. Multiple users of a home network use the network to, say, play video games against each other or to share a printer or Internet connection over the home network.

Advancements in computer technology (both in hardware and software) allow a PC in a home network to have numerous multimedia capabilities, such as playing music or displaying video. With an Internet connection, the PC has the capability to bring additional multimedia information to a user. While PCs have significantly increased capability to deliver multimedia entertainment, large consumer electronic (CE) devices such as televisions (TVs), stereos, or DVD players still, however, often remain the center of the entertainment experience in most households.

Manufacturers and software vendors have begun to address the integration of home networks, multimedia PCs, and CE devices. These manufacturers and vendors have developed protocols and standards that allow for interoperability between PCs and CE devices so that, for example, PCs may manage or distribute multimedia content between multiple CE devices using the home network. Increased usage of home networks for multimedia entertainment, however, will require continued improvement of the integration between the different systems as well as improvement of the overall user experience (including both desirability of features and ease of use).

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
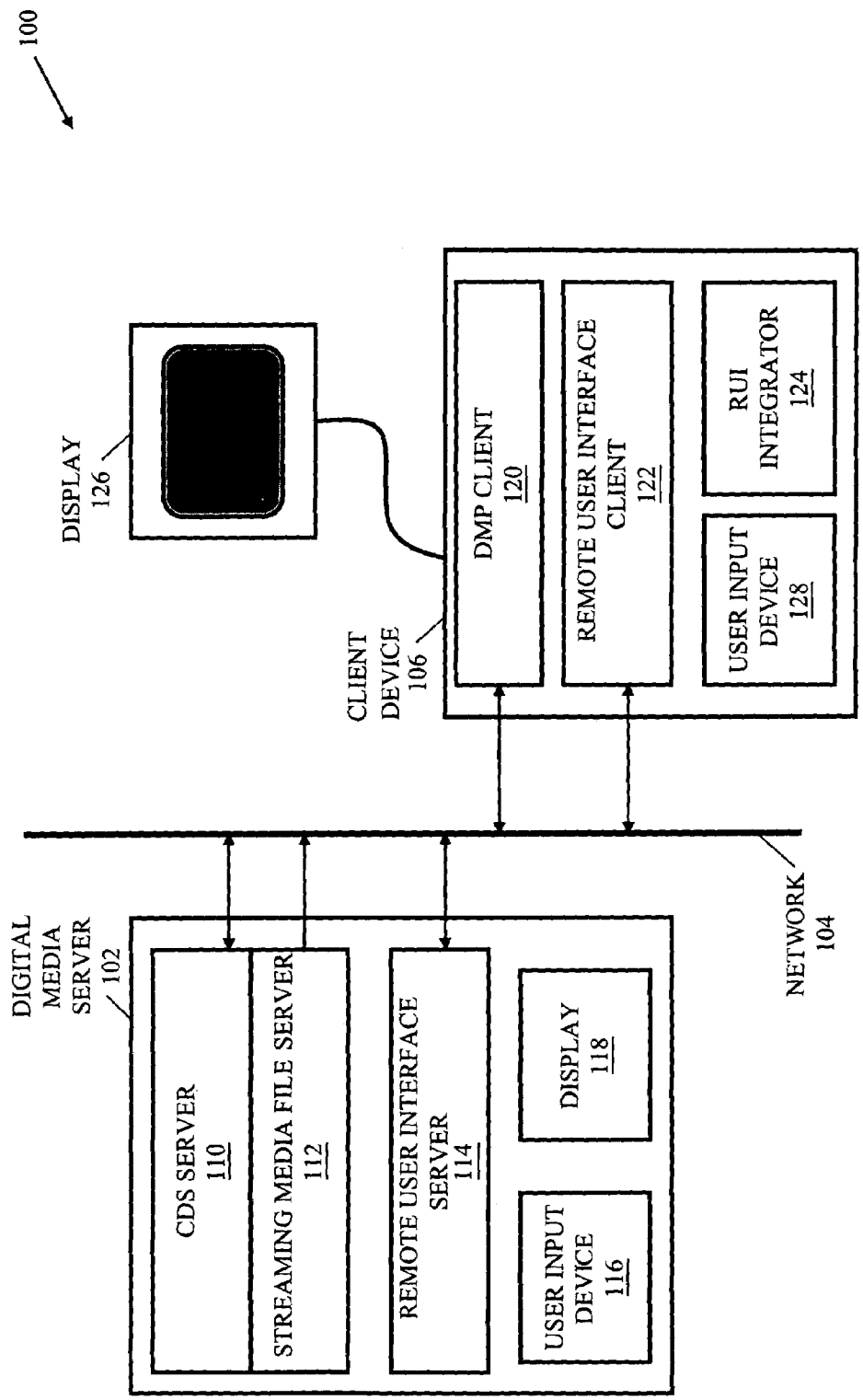
FIG. 1 depicts an embodiment of a system including a client device and a digital media server including a streaming media file server, a remote user interface server, and a content directory service server.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for a client device discovering remote user interface applications over a network are disclosed. Some embodiments may include a remote user interface client of the client device receiving from a content directory service server a code fragment comprising a uniform resource indicator and determining whether the uniform resource indicator is associated with a remote-capable application. Further embodiments may include, in response to determining that the uniform resource indicator is associated with a remote-capable application, switching the connection of the client device from the content directory service server by engaging a remote user interface server. Embodiments may further include a remote user interface client of the client device receiving from a remote user interface server one or more display control commands associated with the remote-capable application and displaying a user interface based on the received display control commands. In some embodiments the code fragment may be included in a container abstraction that binds a group of digital content items with the uniform resource indicator corresponding to a remote-capable application.

Another embodiment comprises a method for accessing and registering both digital content items and a remote-capable application. The method may generally include accessing one or more items of digital content and registering the one or more items of digital content in a content directory service server. The method may also generally include accessing a remote-capable application associated with at least one of the accessed items of digital content and registering the remote-capable application in the content directory service server.

Another embodiment comprises a system comprising a content directory service server, a remote user interface server, and a client device. The content directory service server may store uniform resource indicators for one or more pieces of digital content and for one or more remote-capable applications and the remote user interface server may transmit display control commands to a client device. The client device may have a display and a remote user interface client to receive the display control commands and to generate a user interface based on the display control commands. The client device in some embodiments may also have a remote user interface integrator to engage with the remote user interface server based on a received uniform resource indicator associated with a remote-capable application.

The disclosed system and methodology may advantageously provide a mechanism for a client device to discover remote user interface applications over a network. A user of a client device may select a remote-capable application based on its registration in a content directory service server and receive as the resulting user interface display a user interface from the remote-capable application. The remote-capable application may in some embodiments be related to items of digital content, providing a mechanism for digital content vendors to deploy a branded or other custom user interface to be utilized for browsing, rendering and management of that vendor's content listing. The disclosed system and methodology may thus provide an enhanced user experience.

Turning now to the drawings, FIG. 1 depicts an embodiment of a system including a client device and a digital media server including a streaming media file server, a remote user interface server, and a content directory service server. The remote user interface system 100 may include one or more digital media servers 102 in communication with one or more client devices 106 via a network 104. Digital media server 102 may include one or more devices that provide digital media content acquisition, recording, storage, and/or sourcing capabilities. In some embodiment, the digital media server 102 may provide content or copyright protection enforcement, such as digital rights management (DRM), as required. In one embodiment, the digital media server 102 (and any of its components) meets the guidelines specified by the Digital Living Network Alliance (DLNA) (DLNA Home Networked Device Interoperability Guidelines v1.0, 2004). The digital media server 102 may provide access to digital content to one or more client devices 106 over network 104. In one embodiment, digital media server 102 may serve as a part of a digital home entertainment system and may facilitate delivery of multimedia content to other components of the remote user interface system 100, such as client devices 106 or other digital media servers 102. Digital content may include any type of multimedia content, such as audio (e.g., music), video (e.g., programs, movies, etc.), images (e.g., photographs, charts, etc.), or the like. Digital content may include both unrestricted content and content protected by DRM schemes or other copyright or content protection methodologies.

In one embodiment, digital media server 102 may be a general or special purpose computer system such as one or more of a PC, workstation, server, mainframe computer, notebook or laptop computer, tablet PC, desktop computer, portable computer system, or the like. The computer system may, in one embodiment, include a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter, all electrically connected using a motherboard or system planar. Digital media server 102 may alternatively be any device capable of digital media content acquisition, recording, storage, or sourcing, such as an advanced set-top box (STB), personal video recorder (PVR), stereo, home theater system, music server, broadcast tuner, video or imaging capture devices (i.e., cameras, camcorders, etc.), multimedia mobile phone, multimedia personal digital assistant (PDA), or the like.

The digital media server 102 of the depicted embodiment includes a content directory server 110, a streaming image file server 112, a remote user interface server 114, a user input device 116, and a display 118. The content directory service server 110 may enumerate the identity and location of any digital content in the remote user interface system 100. In one embodiment, the content directory service (CDS) server 110 may correspond to the Universal Plug and Play (UPnP) Content Directory: 1 standard (Content Directory: 1 Service Template Version 1.01, UPnP Forum, Jun. 25, 2002). The CDS server 110, which is described in more detail in relation to FIG. 2, may include both content items representing individual pieces of digital content as well as content containers representing collections of content items (such as a playlist, CD, photo album, DVD, etc.). The content items enumerated in the CDS server 110 may be located at the digital media server 102, at another device in communication with the digital media server 102 or network 104, or may be located remotely such as on the Internet. Each CDS server 110 object (including content items and content containers) may include meta-data describing various attributes of the object (such as title, artist, media type, genre, duration, DRM information, etc.), technical properties such as Multipurpose Internet Mail Extension (MIME) type, and may also include a unique Universal Resource Identifier (URI) to uniquely identify content and its location. A URI is a name or address that identifies a location on a network for an object and includes Uniform Resource Locators (URLs). The CDS server 110 may use any type of internal storage mechanism or structure, such as content hierarchy with meta-data for each object or directory or file hierarchy of an internal file system.

A device such as the client device 106 may use the CDS server 110 to view the enumerated list of the CDS server 110 to select and access a content object enumerated in the CDS server 110. The CDS server 110 of one embodiment allows 'browse' and 'search' commands. The browse command may begin at the root of the CDS server 110 hierarchy and iteratively examine its structure, including each content container, until the desired content item is found. The search command may locate all of the items or containers that possess certain attributes (e.g., performed by a particular musical group). Using the CDS server 10, a user may therefore locate and access individual objects (e.g., songs, movies, pictures, etc.) that the digital media server 102 is capable of providing.

The CDS server 110 may also advantageously contain references associated with remote-capable applications in addition to content items. Remote-capable applications, in one embodiment, are applications with which users may interact using a user interface from a remote device, such as client device 106. Application references associated with remote-capable applications may include a URI for the remote-capable applications. As will be described in more detail subsequently, storage of remote-capable application URI's in the CDS server 110 allows a device interacting with the CDS server 110 to select and access a remote-capable application from the CDS server 110.

The streaming media file server 112 may facilitate sharing or distribution of digital content amongst the components of the remote user interface system 100. Any of the components of the remote user interface system 100 may store digital content for distribution to other components, and components may also access digital content from sources outside the remote user interface system 100, such as from the Internet or over a cable line or satellite link. The streaming media file server 112 may include software such as Microsoft Corporation's Windows® Media Center Edition™ to manage and stream multimedia digital content.

The remote user interface server 114 may transmit display control or other commands over network 104 to a client device 106 or other device. While engaged with a remote user interface client 122, the remote user interface server 114 may transmit display commands to provide a remote user interface for an application on a remote device such as a client device 106. While the remote user interface server 114, the CDS server 110, and the streaming media file server 112 are depicted as part of the digital media server 102, any or all may alternatively be located on a separate computer system in communication with network 104.

User input device 116 may include any device suitable for inputting information or commands to components of the digital media server 102 such as the remote user interface server 114, such as a keyboard, keypad, mouse, audio input device, or the like. Digital media server 102 may also include a display 118 that is local to the digital media server 102 for displaying digital content or information to a user such as a computer monitor.

Network 104 may be any type or combination of data communications channels, such as LAN or wide area network (WAN), to couple components of the remote user interface system 100. Network 104 may include any combination of wired or wireless networks. In some embodiments, network 104 may include a network in a home coupled via Ethernet, optical media, a wireless network, or the like. In several embodiments, network 104 also couples with the Internet via a cable modem, a digital subscriber line (DSL), a T1 line, a T3 line, satellite link or the like. In further embodiments, network 104 may include a network of temporary connections such as connections via a telephone system. Components of the remote user interface system 100 may utilize a wide variety of wired or wireless schemes including Ethernet (Institute of Electrical and Electronic Engineers (IEEE) Standard 802.3-2002, Carrier Sense Multiple Access with Collision Detection (CSMA/CD) Access Method and Physical Layer Specifications, 2002), Home Phoneline Networking Alliance (HomePNA) (HomePNA Specification 3.0, 2002), Home Radio Frequency (HomeRF) (HomeRF 2.0 Specification, 2002, from the Home Radio Frequency Working Group, Inc.), IEEE Standard 802.11b (Higher-Speed Physical Layer Extension in the 2.4 GHz Band, 1999), IEEE Standard 802.11a (A Very-High-Speed, Highly Scalable Wireless LAN Standard, 1997), IEEE Standard 802.11g (2003), IEEE 1394 (IEEE Standard for a High Performance Serial Bus-Firewire, 1995), UPnP™ (promulgated by the UPnP™ Forum) and Digital Living Network Alliance (DLNA) (DLNA Home Networked Device Interoperability Guidelines v1.0, 2004). Those skilled in the art will recognize, however, that the invention described herein may be implemented utilizing any type of data communications channel.

The client device 106 of the depicted embodiment includes a digital media player (DMP) client 120, a remote user interface client 122, a remote user interface integrator 124, a display 126, and a user input device 128. Display 126 and user input device 128 may be similar to the display 118 and user input device 116, respectively, of the digital media server 102 and the description will not be repeated in the interest of brevity. The client device 106 may be a DMP or other device to provide digital content playback and/or rendering capabilities. In some embodiments, the client device 106 meets the guidelines specified by the Digital Living Network Alliance (DLNA) (DLNA Home Networked Device Interoperability Guidelines v1.0, 2004) for DMPs and/or the Intel® Networked Media Product Requirements (NMPR) guidelines (promulgated by Intel Corporation) for interoperability with other components of the remote user interface system 100. Satisfying NMRP requires a device such as a client device 106 to conform to standards and protocols such as the IEEE 802.11 standards for wireless networking and the Universal Plug and Play (UPnP) and UPnP Audio Visual (AV) standards for installation and connectivity of media devices. Using a client device 106, a user may access digital content from the digital media server 102 or other location, such as by browsing a list of digital content provided by the CDS server 110. Client 106 may include one or more devices such as televisions, monitors or displays, stereos, home theaters, CD/DVD players or recorders, printers, PDAs, multimedia wireless devices, game consoles, broadcast tuners, CE device, or any other device with which a user may access digital content.

The DMP client 120 may interact with the CDS server 110 and streaming media file server 112 of the digital media server 102 to locate, access, and playback digital content. The DMP client 120 may include software such as Microsoft Windows Media Player and Media Center Edition, Dell Computer Corporation's Dell Media Experience, Apple Computer Inc.'s iTunes and Quicktime, or other digital content applications for playing, downloading, or accessing digital content. The remote user interface client 122 may include a remote user interface (RUI) client software stack to translate commands received from the RUI server 114. The RUI client 122 may render user interface graphic display instructions sent by the RUI server 114 to the display 126.

The RUI integrator 124 may advantageously provide for switching from the DMP client 120 to the RUI client 122 in particular situations. As will be described in more detail in relation to FIGS. 4 and 5, the RUI integrator 124 may facilitate switching a user engaged with a DMP client 120 connected to a CDS server 110, to the RUI client 122, which would be connected to the RUI server 114 so that display control commands would be subsequently forwarded to the RUI client 122 portion of the client device 106. The RUI integrator 124 may use the URI of a remote-capable application stored in the CDS server 110 to determine the location of the remote-capable application so that the RUI client 122 then receives display commands related to that remote-capable application from the RUI server 114. A user may thus access the user interface of the remote-capable application instead of a default user interface, which may provide an enhanced user experience. The RUI integrator 124 may be a separate module or any or all of its functions may be performed by the DMP client 120 and/or the remote user interface client 122.

By providing a system and methodology for seamlessly providing user interfaces for remote-capable applications using a URI reference located in a CDS server 110, both users and digital content providers may benefit. Users may receive customized or enhanced user interfaces directly relating to content for which they are browsing or searching using a mechanism that is transparent to the user. Content providers, on the other hand, may use a branded or other custom user interface for their customers that may provide an improved experience, an opportunity to brand the user interface with provider information or logos, advertising, opportunities for premium content, or other items. As a user interface may apply to a container of content items, a digital content provider may, for example, apply the custom user interface to all of the content provided by them. A user would then see the content provider's custom user interface instead of a standard list of text names of available content.

Figure 2:
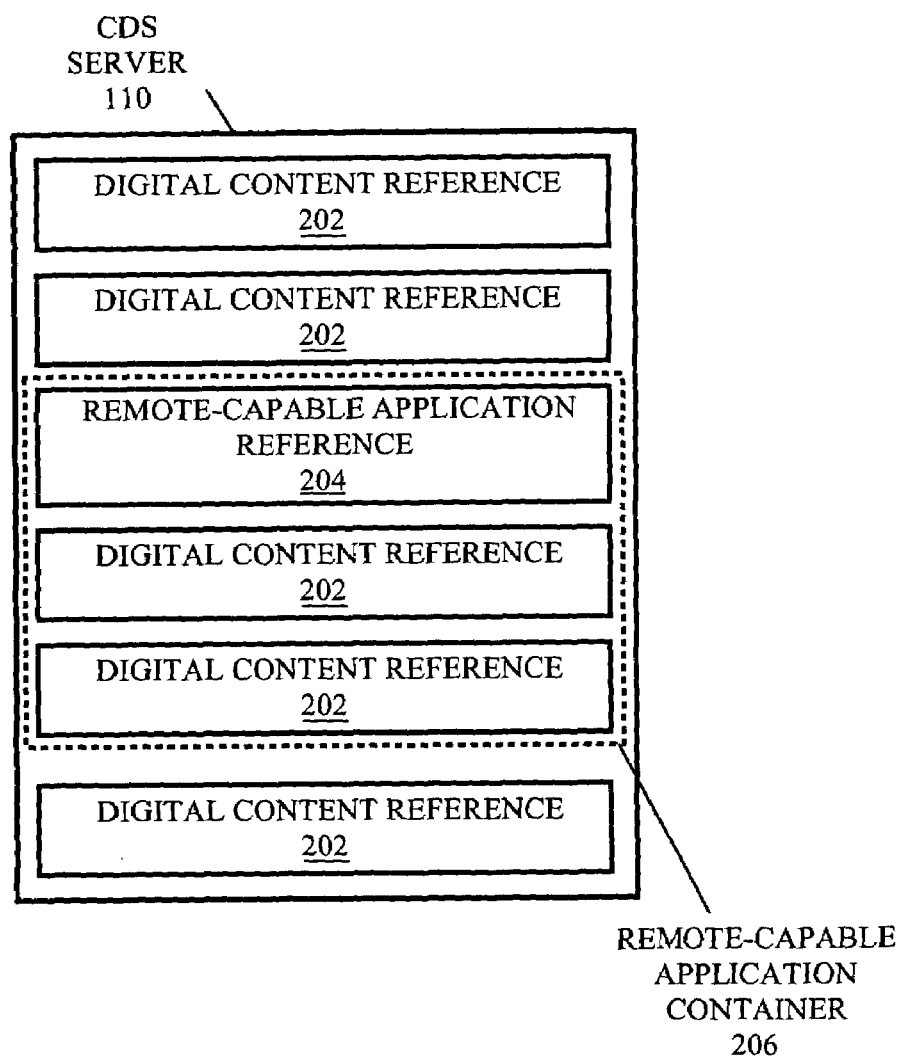
FIG. 2 depicts a schematic view of the content directory service server of FIG. 1 according to one embodiment.

FIG. 2 depicts a schematic view of the CDS server of FIG. 1 according to one embodiment. The CDS server 110 may include one or more digital content references 202 and one or more remote-capable application references 204. The digital content references 202 may be a CDS server 110 object such as a content item or content container and each CDS server 110 object may also include meta-data describing the content, as described previously. The remote-capable application reference 204 may also be a CDS server 110 object and may include a URI and other information for a remote-capable application. The remote-capable application reference 204 may also be a remote-capable application container 206 that binds one or more digital content references 202 with a remote-capable application reference 204 (as represented by the dashed box in FIG. 2). By binding the digital content reference 202 with a remote-capable application reference 204 using a remote-capable application container 206, the bound CDS server 110 objects may be linked to the user interface of the associated remote-capable application according to one embodiment. The CDS server 110 may include any number or combination of digital content references 202 and remote-capable application references 204, and any remote-capable application containers 206 may contain any number or combinations of digital content references 202. The CDS server 110 of the disclosed embodiments may advantageously allow for digital content and remote-capable application references to be commingled in the CDS server 110, allowing the disclosed system to take advantage of the similarities between the two to provide for users discovering remote user interface applications while browsing a CDS server 110 list.

As described previously, the CDS server 110 may allow a user to locate and access individual objects (e.g., songs, movies, pictures, etc.) that the digital media server 102 is capable of providing. The CDS server 110 may include any type of content in its digital content references and a single instance of the CDS server 110 may enumerate all objects, regardless of their type (e.g., MP3, JPEG, MPEG, etc.). A user on a client device 106 may browse, for example, through a simple text list of songs stored on a MP3 player, a list of movies on a DVD-Jukebox, a list of TV shows being broadcast, a list of songs stored in a CD-Jukebox, etc. by utilizing the CDS server 110. A content provider such as a movie studio may provide a remote-capable application that provides an improved user interface for browsing movies from that studio, potentially improving the user experience and providing the studio with the opportunity of providing a branded user interface. By providing the URI of the remote-capable application in a remote-capable application reference 204 in the CDS server 110, the user interface displayed to a user may be transitioned to the studio-provided interface of this example without requiring action by the user.

Figure 3:
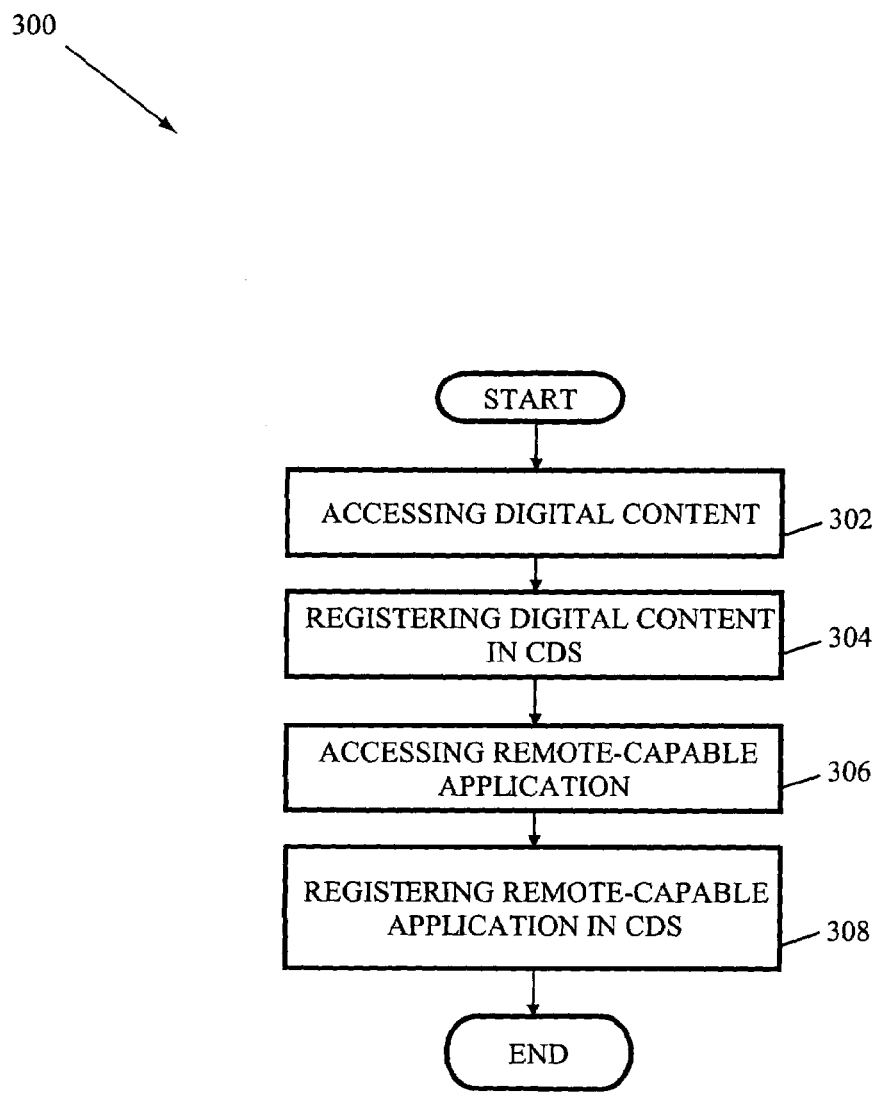
FIG. 3 depicts a flowchart of an embodiment to access and store both digital content and remote-capable applications in a content directory service server.

FIG. 3 depicts a flowchart of an embodiment to access and store both digital content and remote-capable applications in a CDS server 110. In one embodiment, one or more components of a digital media server 102 may perform the elements of flowchart 300. In the depicted embodiment, flowchart 300 begins with accessing digital content at element 302. Accessing digital content may include creating new digital content, downloading digital content over network 104 from another component, downloading digital content from a remote location via the Internet or other network, copying digital content from a fixed media such as a CD or DVD, finding digital content on another computer system or component of the remote user interface system 100, etc. The digital media server 102 may, in one example, access digital content upon request or it may alternatively automatically search for digital content to add to the CDS server 110. After accessing the digital content, the digital media server 102 may register the digital content in the CDS server 110 at element 304. Registration of the digital content in the CDS server 110 may include saving a code fragment (written in XML or other language) with a URI identifying the location of the digital content embedded in the code fragment. The URI may unambiguously identify the digital content (by name and location) as well as the home address of the streaming media file server 112 for streaming the content to client 106. URI and home addresses may be in the Internet Protocol (IP) or other format. A user, for example, may download a music album to their home network and, after the download is complete, the digital media server 102 may create an entry in the CDS server 110 for each song (as well as a container of the entire album) with the download location URI for each song embedded in the appropriate code fragment. This allows a user of a client device 106 accessing the CDS server 110 to initiate streaming of a selected song to the client device 106 for rendering (i.e., playing over their speakers).

In addition to registering digital content in the CDS server 110, the digital media server 102 may also access and register a remote-capable application. At element 306, the digital media server 102 may access the remote-capable application in any fashion (similarly to element 302). As examples, the digital media server 102 may download a remote-capable application from the website of a content vendor or may copy the application from the same media from which it copies related digital content. In one embodiment, the digital media server 102 may automatically access a remote-capable application by accessing it at approximately the same time as it accesses related content. A digital content provider may, in this embodiment, provide an appropriate remote-capable application on a CD or DVD with its content. After accessing the remote-capable application, the digital media server 102 may register the application in the CDS server 110 at element 308. As for digital content, registration of the remote-capable application in the CDS server 110 may include saving a code fragment (written in XML or other language) with a URI identifying the location of the remote-capable application embedded in the code fragment. The URI may unambiguously identify the remote-capable application (by name and location). Remote-capable applications in some embodiments may be written in HyperText Markup Language (HTML) or other language.

While the elements of flowchart 300 are described in reference to being executed by a digital media server 102, one skilled in the art will recognize that some or all of the elements may be performed by a client device 106, a DMP, or any other component of the remote user interface system 100. A client device 106 may, for example, copy digital content and a remote-capable application from a CD and register both with a CDS server 110 located on the digital media server 102.

Figure 4:
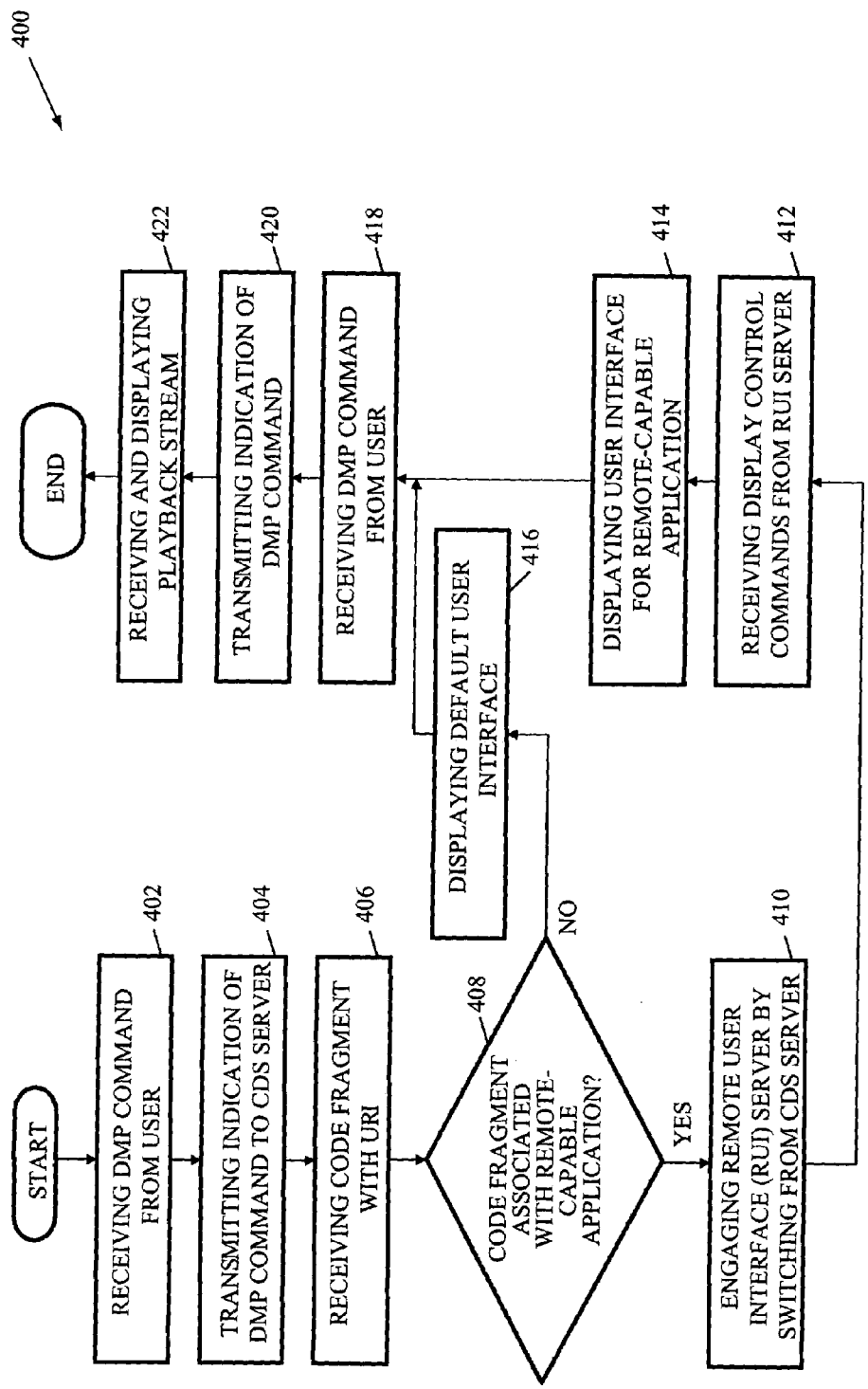
FIG. 4 depicts a flowchart of a first embodiment to discover and utilize a remote-capable application.

FIG. 4 depicts a flowchart of a first embodiment to discover and utilize a remote-capable application. In one embodiment, one or more components of a client device 106 may perform the elements of flowchart 400. In the depicted embodiment, flowchart 400 begins with receiving a DMP command from a user at element 402. At element 402, the DMP client 120 may receive a DMP command (such as scrolling or selecting a CDS server 110 entry) that a user input using a user input device 128. Alternatively, the DMP client 120 may generate a DMP command, such as when a DMP client 120 automatically generates a command selecting a particular CDS server 110 entry upon start-up of the client device 106. The DMP client 120 may next transmit an indication of the DMP command to the CDS server 110 over network 104 at element 404. After the CDS server 110 processes the DMP commands, flowchart 400 continues to element 406, where the DMP client 120 may receive a code fragment with an embedded URI from the CDS server 110 over a connection between the DMP client 120 and the CDS server 110.

After receiving the code fragment, the RUI integrator 124 may determine if the code fragment (and its RUI) is associated with a remote-capable application at decision block 408. The RUI integrator 124 may use any means to make its determination, including by analyzing the URI link itself and filename. If the code fragment corresponds to a remote-capable application URI (or its associated container), flowchart 400 continues to element 410, where the RUI integrator 124 switches the client device 106 from the DMP client 120 to the RUI interface client 122. This may effectively disengage the client device 106 from the CDS server 110 instead engage the RUI client 122 with the RUI server 114. At element 412, the RUI client 122 may receive display control commands from the RUI server 114 as commands are forwarded to the RUI client 122 portion of the client device 106. The RUI client 122 may then display to the user (using display 126) the user interface associated with the remote-capable application at element 414. This may allow, for example, for a vendor to use its own graphical design or branded user interface to display digital content that is part of the same container as the remote-capable application. A remote-capable application designed for a DVD, for example, may result in a user interface with a user interface branded with the movie title and studio name with detailed information about each DVD track, etc. If the code fragment does not correspond to a remote-capable application at decision block 408, flowchart 400 continues to element 416 where the client device 106 displays to the user a default user interface and maintains the connection to the CDS server 110. In one embodiment, the default user interface may be a simple list of content items in the CDS server 110.

After the user views the user interface (whether a default one or a custom one), flowchart 400 continues to element 418, where the user input device 128 may receive a DMP command from the user, such as when a user selects a media item listing on the display 126 for playback (i.e., streaming). Either the DMP client 120 (if decision block 408 was negative) or the RUI client 122 (if decision block 408 was affirmative) may then transmit an indication of the DMP command at element 420, and the DMP client 120 may receive and display the playback stream to the user at element 422, after which flowchart 400 terminates.

Figure 5:
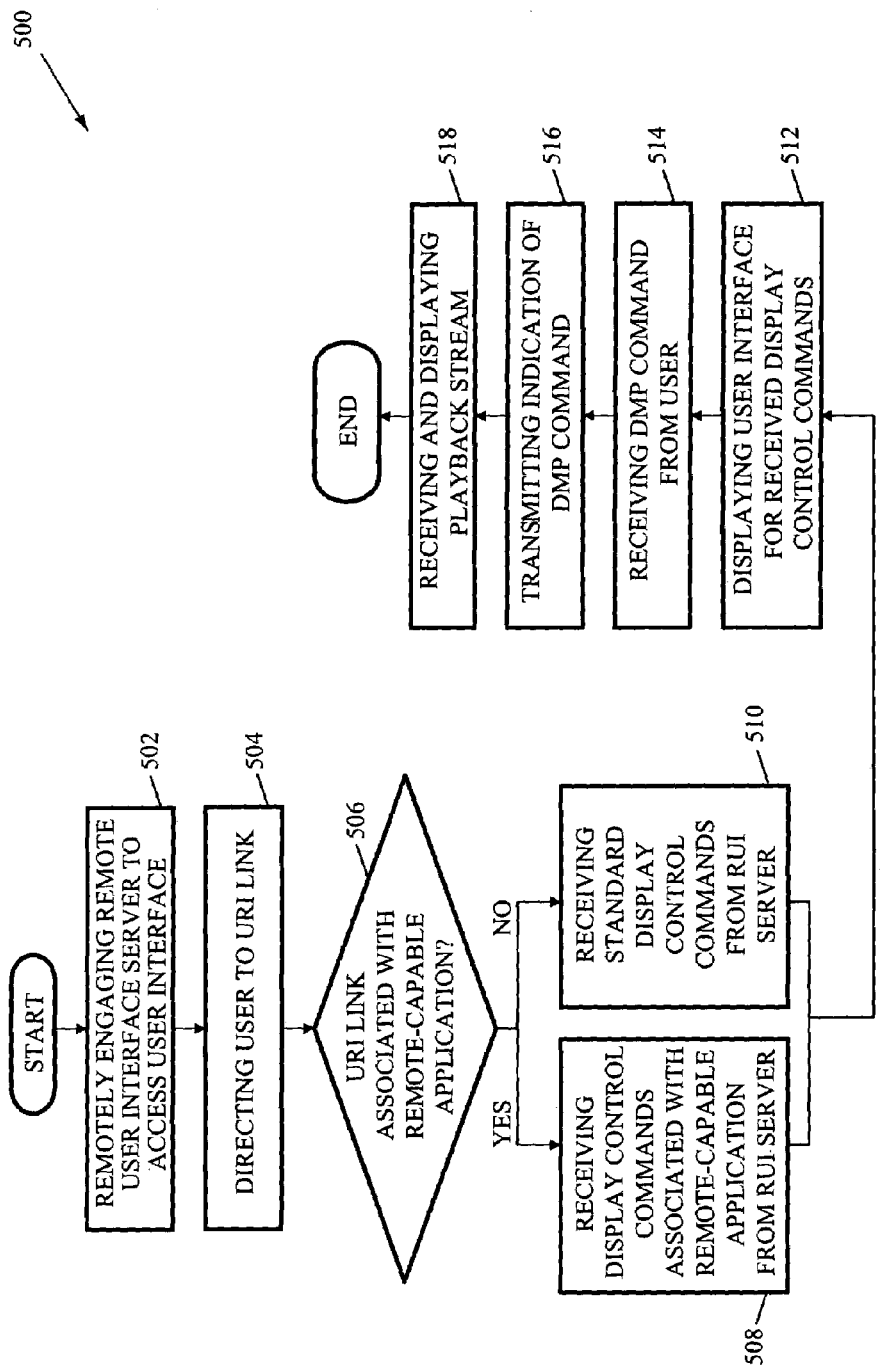
FIG. 5 depicts a flowchart of a second embodiment to discover and utilize a remote-capable application.

FIG. 5 depicts a flowchart of a second embodiment to discover and utilize a remote-capable application. In one embodiment, one or more components of a client device 106 may perform the elements of flowchart 500. In the depicted embodiment, flowchart 500 begins with element 502, remotely engaging a RUI server 114 to access a user interface. In one embodiment, a RUI client 122 may perform element 502, allowing the user to peruse through display web pages using a default user interface. A user may select a link or be otherwise directed to a URI at element 504, which may be stored at a CDS server 110 in one embodiment. At decision block 506, the RUI integrator 124 may determine whether the URI to which the user was directed is associated with a remote-capable application. If the URI link is associated with a remote-capable application, flowchart 500 may continue to element 508, where the RUI client 122 may receive display control commands associated with the remote-capable application from the RUI server 114. The RUI client 122 may thus provide the user with an interactive, remote-capable vendor-specific application user interface. The RUI client 122 may display to the user of the client 106 digital content listings using the custom user interface at element 512. If the URI link is not associated with a remote-capable application at decision block 506, flowchart 500 may continue to element 510, where the RUI client 122 may receive standard display control commands from the RUI server 114. The RUI client 122 may then use a default user interface to display digital content to a user at element 512. In one embodiment, the default user interface may be vendor-agnostic interface provided by the client device 106.

After displaying a user interface to the user, the RUI client 122 (through display 126) may receive a DMP command from a user at element 514. At element 514, the RUI client 122 may receive a DMP command such as scroll command or a selection of a CDS server 110 digital content entry. The RUI client 122 may next transmit an indication of the DMP command to the CDS server 110 over network 104 at element 516. After the CDS server 110 processes the DMP commands, flowchart 500 continues to element 518, where the DMP client 120 may receive and display a playback stream received from the streaming media file server 112.

The methodology of flowchart 500 differs from that of flowchart 400 by, among other differences, the client device 106 of flowchart 500 beginning with the RUI client 122 engaged with the RUI server 114 instead of the DMP client 120 being engaged with the CDS server 110. Both methodologies may provide a user experience whereby a user is automatically and seamlessly transferred to a user interface based on a remote-capable application when an appropriate URI is selected, replacing the text-based or vendor-agnostic default user interface. This allows digital content providers or vendors, as one example, to provide custom user interfaces for a container of digital content provided by them. When the URI for the container is selected, a default user interface may be replaced by the custom user interface. Digital content providers and vendors may thus provide a custom user interface that may enhance the user experience as well as provide an opportunity for the provider or vendor to brand or otherwise take advantage of the user interface.

One embodiment of the invention is implemented as a program product for use with a computer system such as, for example, the remote user interface system 100 or its components as shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., hard-disk drive or floppy disks within a diskette drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates systems, methods, and media to discover remote user interface applications over a network. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving from a user, by a client device having both a remote user interface (RUI) client and a digital media player (DMP) client, a digital media player command to request access to a piece of content of listed in a content directory service (CDS) server;
   transmitting the command by the digital media player client of the client device to the content directory service server, the command being associated with a digital media player capability;
   receiving by a remote user interface integrator of the client device from the content directory service server a code fragment, the code fragment comprising a uniform resource indicator;
   determining by the remote user interface integrator of the client device whether the uniform resource indicator is associated with a remote-capable application specific to a particular group of content files and having a customized user interface;
   in response to determining that the uniform resource indicator is associated with the remote-capable application, switching by the remote user interface integrator the client device from the digital media player client to the remote user interface client, wherein switching the client device comprises disengaging the client device from the content directory service server and engaging the client device to a remote user interface server based on the uniform resource indicator;
   receiving by the remote user interface client of the client device from the remote user interface server one or more display control commands associated with the remote-capable application; and
   displaying by the remote user interface client of the client device a user interface specific to the remote-capable application based on the received display control commands.

2. The method of claim 1, further comprising
   receiving by the client device from a streaming image media server a playback stream of the digital content and displaying by the client device the playback stream.

3. The method of claim 1, further comprising, in the event the uniform resource indicator is not associated with the remote-capable application, displaying a default user interface.

4. The method of claim 1, wherein the code fragment further comprises a container, the container comprising one or more digital content references and one or more remote-capable application references.

5. The method of claim 1, wherein the displayed user interface comprises one or more items of digital content, the displayed user interface being associated with the one or more items of digital content.

6. A program product having a storage medium containing instructions effective, when executing in a data processing system, to cause said data processing system to perform operations comprising:
   receiving from a user, by a client device having both a remote user interface (RUI) client and a digital media player (DMP) client, a digital media player command to request access to a piece of content of listed in a content directory service (CDS) server;
   transmitting the command by the digital media player client of the client device to the content directory service server. the command being associated with a digital media player capability;
   receiving by a remote user interface integrator of the client device from the content directory service server a code fragment, the code fragment comprising a uniform resource indicator;
   determining by the remote user interface integrator of the client device whether the uniform resource indicator is associated with a remote-capable application specific to a particular group of content files and having a customized user interface;
   in response to determining that the uniform resource indicator is associated with the remote-capable application, switching by the remote user interface integrator the client device from the digital media player client to the remote user interface client, wherein switching the client device comprises disengaging the client device from the content directory service server and engaging the client device to a remote user interface server based on the uniform resource indicator;
   receiving by the remote user interface client of the client device from the remote user interface server one or more display control commands associated with the remote-capable application; and
   displaying by the remote user interface client of the client device a user interface specific to the remote-capable application based on the received display control commands.

7. The program product of claim 6, further comprising
   receiving by the client device from a streaming image media server a playback stream of the digital content and displaying by the client device the playback stream.

8. The program product of claim 6, further comprising, in the event the uniform resource indicator is not associated with the remote-capable application, displaying a default user interface.

9. The program product of claim 6, wherein the code fragment further comprises a container, the container comprising one or more digital content references and one or more remote-capable application references.

10. The program product of claim 6, wherein the displayed user interface comprises one or more items of digital content, the displayed user interface being associated with the one or more items of digital content.

11. A method comprising:
   accessing by a digital media server one or more items of digital content from a source;
   accessing by the digital media server a remote-capable application from the source, the remote-capable application providing a remote user interface to the one or more items of digital content and having a customized user interface;
   registering by the digital media server in a particular content directory service server the one or more items of digital content by saving a code fragment comprising a uniform resource indicator providing an indication of a location for the digital content; and
   registering by the digital media server the remote-capable application in the particular content directory service server by saving a code fragment comprising a uniform resource indicator providing an indication of a location for the remote-capable application.

12. The method of claim 11, wherein accessing one or more items of digital content comprises one or more of downloading digital content, copying digital content, or finding digital content.

13. The method of claim 11, wherein accessing a remote-capable application from the source comprises one or more of downloading the remote-capable application from the source, copying the remote-capable application from the source, or finding the remote-capable application at the source.

14. A digital content system, comprising:
   a content directory service server to store uniform resource indicators for one or more pieces of digital content and for one or more remote-capable applications the one or more remote-capable applications providing a remote user interface for particular pieces of digital content;
   a remote user interface server to transmit display control commands; and
   a client device in communication with the content directory service server and the remote user interface server comprising:
      a digital media player client to play digital content and to interact with the content directory service server by transmitting user commands associated with a digital media player capability to the content directory service server;
      a remote user interface client to receive the display control commands and to generate a user interface based on the display control commands and utilizing a customized remote user interface provided by a remote-capable application associated with content being viewed;
      a remote user interface integrator to disengage the client device from the content directory service server and to engage the client device with the remote user interface server in response to determining that a received uniform resource indicator is associated with a remote-capable application; and
      a display.

15. The digital content system of claim 14, further comprising a streaming media file server to distribute digital content.

16. The digital content system of claim 14, wherein the content directory service server and the remote user interface server are located on a digital media server.

17. The digital content system of claim 14, wherein the client device further comprises a user input device.

18. The digital content system of claim 14, wherein the client device comprises one or more of a television, display, monitor, stereo, home theater, printer, personal digital assistant, multimedia wireless device, game console, broadcast tuner, consumer electronic device, CD player, or DVD player.

* * * * *

UNITED STATES PATENT AND TRADEMARK OFFICE
CERTIFICATE OF CORRECTION

PATENT NO. : 7,519,681 B1 Page 1 of 1
APPLICATION NO. : 11/171742
DATED : April 14, 2009
INVENTOR(S) : Jim Edwards et al.

It is certified that error appears in the above-identified patent and that said Letters Patent is hereby corrected as shown below:

In column 12, line 28, in Claim 6, delete "server." and insert -- server, --, therefor.

In column 13, line 35, in Claim 14, delete "applications" and insert -- applications, --, therefor.

Signed and Sealed this

Twenty-eighth Day of July, 2009

JOHN DOLL
*Acting Director of the United States Patent and Trademark Office*